UNITED STATES PATENT OFFICE.

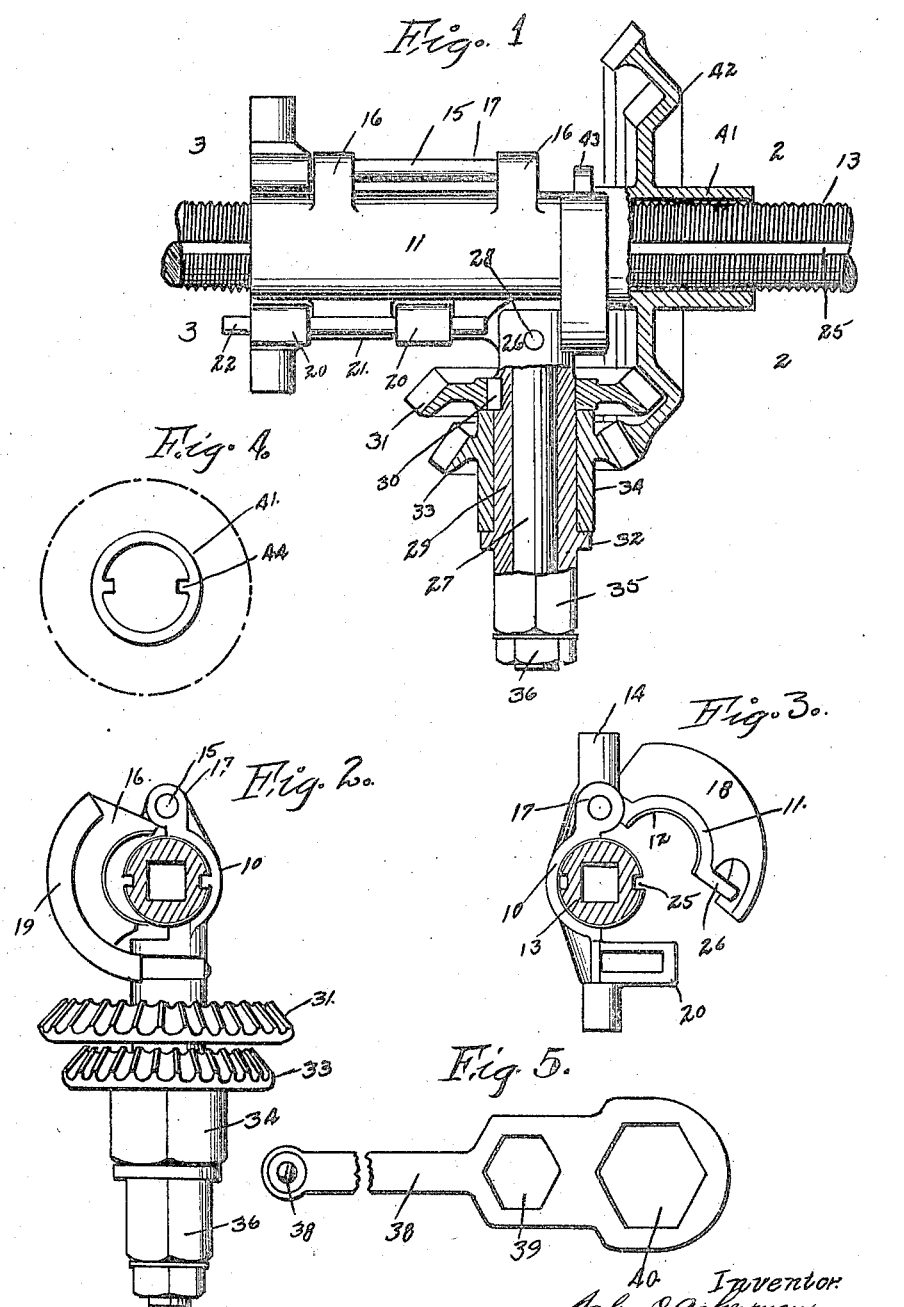

JOHN O. ACKERMAN AND JOHN MOE, OF DES MOINES, IOWA.

DRILL-OPERATING MECHANISM.

1,301,531.    Specification of Letters Patent.    Patented Apr. 22, 1919.

Application filed July 3, 1918. Serial No. 243,181.

*To all whom it may concern:*

Be it known that we, JOHN O. ACKERMAN and JOHN MOE, a citizen of the United States and a subject of the King of Norway, respectively, and residents of Des Moines, in the county of Polk and State of Iowa, have invented a certain new and useful Drill-Operating Mechanism, of which the following is a specification.

The object of our invention is to provide a drill operating mechanism for miners' drills of simple, durable and inexpensive construction.

More particularly it is our object to provide a drill operating mechanism for hand operated drills of the type used in mining bituminous coal, so constructed and arranged that by very simple adjustment different speeds may be imparted to the drill shaft.

With these and other objects in view our invention consists in the construction, arrangement and combination of the various parts of the device, whereby the objects contemplated are attained, as hereinafter more fully set forth, pointed out in our claims and illustrated in the accompanying drawings, in which:

Figure 1 shows a side elevation of a drill operating mechanism partly in section showing the drill shaft or rod in position for drilling into a face of a wall.

Fig. 2 shows a sectional view taken on the line 2—2 of Fig. 1, the gear on the shaft being omitted for the purpose of better illustrating other parts of the device.

Fig. 3 shows a sectional view, taken on the line 3—3 of Fig. 1, of the frame of the device.

Fig. 4 shows an end view of the sleeve on which the double gear is mounted; and

Fig. 5 shows a side elevation of the crank handle.

In the accompanying drawings we have used the reference numeral 10 to indicate generally one-half of the frame or bearing for the drill shaft, which has substantially the form of a half cylinder. Pivoted to the bearing or frame member 10 is a coacting bearing or frame member 11, which is similar in its general shape and is designed to form the other half of a bearing. The frame members 10 and 11 are provided with internal screw-threads 12 to receive a screw-threaded drill shaft 13.

At what may be called the outer or upper end of the frame members or bearing members, the bearing member 10 is provided with opposite spindles 14. The frame members 10 and 11 are hinged together by means of a pintle 15 extending through alined lugs 16 and 17 which have openings for forming bearings and are formed on the respective bearing members 10 and 11.

At what may be called the inner or lower end of the frame member 11 is formed a laterally extending flange 18, at the outer edge of which is a curved inwardly opening channel 19.

On the bearing 10 are formed a pair of spaced yokes or loops 20, and on the bearing 11 at the free edge thereof is a lug 21.

The shaft 13 is locked in the bearings 11 by means of a wedge 22 received in the loops or yokes 20 and engaging the lug 21.

The shaft 13 is externally screw-threaded to coact with the screw-threads on the bearings 10 and 11 and is provided with opposite longitudinal grooves 25.

Formed on the bearing member 10 near the inner end thereof is a socket bearing 26 into which is inserted one end of a shaft 27 which is secured in the bearing 26 by means of a pin 28.

Mounted on the shaft 27 is a sleeve 29, on the inner end of which, is fixed by means of a spline 30, a beveled gear 31.

Near the outer end of the sleeve 29 is an annular shoulder 32.

Loosely mounted on the sleeve 29 between the gear 31 and the shoulder 32 is a smaller beveled gear 33 having a hub 34 angular in outline.

The outer end of the sleeve 29 is angular in outline at 35. On the outer end of the shaft 27 is screwed a nut 36.

There is provided in connection with our drill operating mechanism, a crank arm 37 having at one end a handle 38, and at the other end spaced openings 39 and 40 of different sizes and adapted to fit the angular portions 35 and 34, respectively.

In this connection it may be mentioned that the sizes of the parts are such as to permit the angular portion 35 to freely receive and snugly fit the opening 39, and to permit the portion 34 to snugly enter and fit the opening 40.

Mounted on the inner end of the shaft 13 is a sleeve 41, on which is formed a double gear 42 meshing with the gears 33 and 31 respectively, as indicated in Fig. 1.

On what may be called the outer end of the sleeve 41 is an annular flange 42, a portion of which is received in the channel 39.

When the parts are assembled, the wedge 22 is inserted in position. The channel 19 holds the double gear 42 in proper position with relation to the bearing 11.

We will now explain the practical use of our improved drill operating mechanism.

It is well-known that in certain sections of the country, for instance, in the bituminous coal fields of Iowa, that a great deal of drilling is done by hand.

It is also well-known among miners in these sections of the country, that sometimes the drilling is hard and sometimes it is much easier.

It is, therefore, desirable that a drill should be provided which may be operated at different speeds. Where the drilling is hard the slower speed may be used, while where the drilling is easy, the higher speed is desirable.

The gears of our improved device are so arranged that in drilling with it one speed may be obtained by mounting the handle 38 on the mechanism with the angular portion 34 of the hub of the gear 33 received in the opening 40.

When another speed is desired, the handle may be quickly and easily removed and then placed in position with the angular portion 35 of the sleeve 29 received in the opening 39.

When the first position of the handle is assumed and the drill is operated, motion will be transmitted from the hub 34 to the gears 33 and thence to the double gear 42 and to the drill.

It should be mentioned that the sleeve 41 is formed with oppositely inwardly extending ribs 44 which enter the grooves 25.

When the second position of the handle is taken, motion will be transmitted through the sleeve 29 to the gear 31, and thence to the gear 42 at a different speed ratio.

It will be seen that rotation of the gear 42 will impart rotation to the shaft 13 on account of the ribs 44 which enter the grooves 25. At the same time longitudinal movement of the drill shaft 13 will occur on account of the coaction of the screw-threads on the drill 13 with the screw-threads on the interior of the bearing members 10 and 11.

A drill of this kind enables the miner to secure two different speeds, and thereby enables him to do considerable more work in a day than would otherwise be the case.

It also assists the miner to work with less strain on account of the fact that he can adjust his speed on the drill according to the work he is doing.

Some changes may be made in the construction and arrangement of the parts of our improved device without departing from the essential features and purposes of our invention, and it is our intention to cover by our claims any modified forms of structure or use of mechanical equivalents which may be reasonably included within their scope.

We claim as our invention:

1. A drill operating mechanism comprising a two-part screw-threaded bearing, the parts of said bearing being open at one edge, and being detachably connected at the other edge, said bearing being internally screw-threaded, a screw-threaded shaft received in said bearing having a longitudinal groove, a sleeve mounted on said shaft adjacent to one end of said bearing having a double gear formed thereon, means for permitting said sleeve to rotate and for holding said sleeve against longitudinal movement with relation to said bearing, a bearing formed on one of said first bearings, a shaft having one end mounted in said last described bearing, and arranged at right-angles to said first shaft, a sleeve on said second shaft having fixed at one end a beveled gear meshing with one of the sets of said double gear, said sleeve having at one end an angular portion, and having adjacent to said angular portion an annular shoulder, a beveled gear mounted on said sleeve in mesh with the other set of teeth on said beveled gear, said last described beveled gear having a hub angular in outline bearing against said shoulder, and a crank handle having a pair of spaced openings designed to fit respectively on the angular portions of said sleeve and on the angular hub of said last described beveled gear.

2. In a device of the class described, an internal screw-threaded bearing, a screw-threaded shaft mounted therein, a sleeve rotatably but non-slidably mounted on said bearing, having a double gear formed thereon, means for connecting said sleeve with said shaft for causing the shaft to rotate with the sleeve, a second bearing on said first bearing, a shaft therein, a gear on said shaft meshing with one of said first gears, a sleeve on said shaft, a gear on said sleeve meshing with the other of said first gears, and means for selectively operating either sleeve on said shaft.

Des Moines, Iowa, June 7, 1918.

JOHN O. ACKERMAN.
JOHN MOE.